US010836675B2

(12) United States Patent
Leivo et al.

(10) Patent No.: US 10,836,675 B2
(45) Date of Patent: Nov. 17, 2020

(54) SCRATCH RESISTANT, EASY-TO-CLEAN COATINGS, METHODS OF PRODUCING THE SAME AND THE USE THEREOF

(71) Applicant: BASF SE, Ludwigshafen am Rhein (DE)

(72) Inventors: Jarkko Leivo, Tampere (FI); Admir Hadzic, Oulu (FI); Milja Hannu-Kuure, Haukipudas (FI); Ari Karkkainen, Oulu (FI); Henna Jaervitalo, Oulu (FI); Rauna-Leena Kuvaja, Oulu (FI); Matti Pesonen, Oulu (FI)

(73) Assignee: OPTITUNE Oy, Oulu (FI)

( * ) Notice: Subject to any disclaimer, the term of this patent is extended or adjusted under 35 U.S.C. 154(b) by 47 days.

(21) Appl. No.: 15/557,689

(22) PCT Filed: Mar. 17, 2016

(86) PCT No.: PCT/FI2016/050165
§ 371 (c)(1),
(2) Date: Sep. 12, 2017

(87) PCT Pub. No.: WO2016/146895
PCT Pub. Date: Sep. 22, 2016

(65) Prior Publication Data
US 2018/0127308 A1    May 10, 2018

Related U.S. Application Data

(60) Provisional application No. 62/134,045, filed on Mar. 17, 2015.

(30) Foreign Application Priority Data

Mar. 17, 2015 (FI) ..................... 20155185

(51) Int. Cl.
C03C 17/30 (2006.01)
G06F 1/16 (2006.01)
H04M 1/02 (2006.01)
C08L 83/08 (2006.01)

(52) U.S. Cl.
CPC .............. *C03C 17/30* (2013.01); *C08L 83/08* (2013.01); *G06F 1/1643* (2013.01); *H04M 1/026* (2013.01); *C03C 2217/73* (2013.01); *C03C 2217/76* (2013.01)

(58) Field of Classification Search
None
See application file for complete search history.

(56) References Cited

U.S. PATENT DOCUMENTS

| 5,800,926 A | 9/1998 | Nogami et al. |
| 6,790,532 B1 | 9/2004 | Gier et al. |
| 7,094,709 B2 | 8/2006 | Kärkkäinen |
| 2007/0155897 A1 | 7/2007 | Tani et al. |
| 2014/0261673 A1 | 9/2014 | Nair et al. |
| 2015/0037570 A1 | 2/2015 | Brophy et al. |

FOREIGN PATENT DOCUMENTS

| CN | 104101918 A | 10/2014 |
| EP | 1 146 092 A2 | 10/2001 |
| EP | 1 555 249 A1 | 7/2005 |
| EP | 1 719 793 A1 | 11/2006 |
| JP | 7-138047 A | 5/1995 |
| JP | 2002-521522 | 7/2002 |
| JP | 2009-208898 | 9/2009 |
| JP | 2012-37866 A | 2/2012 |
| JP | 2014-151588 A | 8/2014 |
| KR | 10-2009-0043397 A | 5/2009 |
| WO | WO 2014/092391 A1 | 6/2014 |
| WO | WO 2014/163376 A1 | 10/2014 |

OTHER PUBLICATIONS

International Preliminary Report on Patentability and Written Opinion of the International Searching Authority dated Sep. 19, 2017 in PCT/FI2016/050165 filed Mar. 17, 2016.
European Office Action dated Apr. 8, 2019 in European Patent Application No. 16717416.8, 8 pages.
Search Report and Written Opinion dated Oct. 2, 2018 in corresponding Singaporean Patent Application No. 11201707452Y, 15 pages.
Office Action issued in corresponding Japanese Application No. 2017-548283, dated Dec. 24, 2019.

*Primary Examiner* — Robert T Butcher
(74) *Attorney, Agent, or Firm* — Oblon, McClelland, Maier & Neustadt, L.L.P.

(57) ABSTRACT

A computer or personal communication device or a similar device, comprising a CPU; and a display; wherein the display comprises; an array of optical elements; a touch sensor; and a glass cover having a coating that is oleophobic. The coating of the glass is a polymer having silicon, oxygen and carbon in the backbone. Optionally it may comprise fluorine. The coating has a water contact angle of 65 or more, an oil contact angle of 20 degrees or more, and a pencil hardness of 7H or more. Thus, the coating combines properties of hydro-and oleophobicity and hardness.

2 Claims, 3 Drawing Sheets

SCRATCH RESISTANT, EASY-TO-CLEAN COATINGS, METHODS OF PRODUCING THE SAME AND THE USE THEREOF

CROSS-REFERENCE TO RELATED APPLICATIONS

This application is a National Phase of PCT/FI2016/050165, which was filed on Mar. 17, 2016. This application is based upon and claims the benefit of priority to U.S. Provisional Application No. 62/134,045, which was filed on Mar. 17, 2015, and to Finnish Application No. 20155185, which was filed on Mar. 17, 2015.

BACKGROUND OF THE INVENTION

Field of the Invention

The present invention relates to solution processible hybrid organic-inorganic polymer materials and their use in optoelectronics device structures such as display devices, touch screen devices and photovoltaic devices and devices in general which benefit from optimizing the transmission qualities of the interfaces to improve device functionality or performance. In particular, the invention relates to materials which have suitable properties for use as scratch resistant, anti-smudge/easy-to-clean coating with optimized antireflection properties at the cover substrate-air interface in the optoelectronic device structure. The invention also relates to methods of applying the materials in various optoelectonic device fabrication processes and to synthesis and polymerization of such material compositions.

Description of Related Art

In many state-of-art anti-fingerprint (in the following also abbreviated "AFP") coatings, sometimes also called easy-to-clean (in the following also "E2C") coatings, fluorinated and/or silanized hybrid compounds are used to obtain both hydrophobic and oleophobic character to the outer surface of the coating.

Although these surfaces typically have good AFP and/or E2C characteristics on glass, they, however, often show visible fingerprint or other human contaminant still after a wipe-off. To prevent this, in some cases an orange peel topography is prepared during the coating process to hinder the reflectance discontinuities caused by the smudge, i.e., to hinder the visibility of the fingerprint on clear, topographically smooth, thin, and glossy glass surface. This is especially true when thicker organic polymer matrixes are used in the coating material. For example for hybrid materials, in EP 1555249 A1 (Nanogate), silicone alkoxides are used as precursors for the coating material.

For many of the anti-fingerprint coatings in the market, it is also true that their combined adhesion and hardness properties, so to say their scratch resistance, is not that good what would be expected for pieces under daily use, including mobile phone window and PC-tablet glass window applications, so the AFP and/or E2C effect will be quickly eroded off from the coated surface.

SUMMARY OF THE INVENTION

It is an aim of the present invention to provide chemically and mechanically and environmentally highly stabile coating material layer for substrate surfaces, which has combined anti-smudge/easy-to-clean and anti-reflectivity properties.

It is an aim of the present invention to provide liquid phase coating materials, which can be applied by an atmospheric deposition process, such as spin, dip, spray, ink-jet, gravure, slit/slot, roll-to-roll, drip, curtain and roller coating processes.

In particular it is an aim of the present invention to provide materials which will give the properties of anti-smudge and easy-to-clean together with anti-reflectivity properties combined in a single coating layer.

Thus, it is an aim of the present invention to provide new material compositions that have suitable properties to be used as single layer anti-smudge/easy-to-clean and anti-reflectivity coating on glass surfaces.

It is a further aim of the present invention to provide material compositions that are suitable for producing films (and structures) by using conventional and cost-efficient processing from the liquid phase, including spin-on, dip, spray, ink-jet, roll-to-roll, gravure, flexo-graphic, curtain, drip, roller, screen printing coating methods, extrusion coating and slit coating, but are not limited to these.

It is also an aim of the present invention to provide material compositions that are capable of producing optically good quality films even on structured (textured) glass substrate surfaces.

It is a further aim of the present invention to provide a computer or personal communication device, comprising a central processing unit (CPU) and a display wherein the display comprises an array of optical elements; a touch sensor; and a glass cover having a coating that is antireflective and oleophobic hard coating.

It is an aim of the present invention to provide a glass substrate having an antireflective and oleophobic hard coating thereon, wherein the coating is a polymer having silicon, oxygen and carbon in the backbone, and wherein the coating has a refractive index of 1.22 to 1.7, a pencil hardness of 6H or more preferably 8H or more, a water contact angle of 65 degrees or more, e.g. 70 degrees or more, and an oil contact angle of 20 degrees or more, e.g. 30 degrees or more.

Thus, the materials combine properties of hydro- and oleophobicity.

It is an aim of the present invention to provide a method for making coated glass and coated polymer sheets.

It is an aim of the present invention to provide a method of increasing the anti-reflectivity, hardness and oleophobicity of a computer or personal communication device having a touch sensitive screen.

The present invention provides material compositions comprising hybrid siloxane polymers.

Suitable materials of the present kind can be produced by hydrolysing silane monomer(s); condensation polymerizing the hydrolysed silane monomer(s) to form a carbosiloxane prepolymer; and mixing the carbosiloxane polymer with at least one solvent capable of dissolving said polymer and, optionally with at least one additive, in order to formulate a carbosiloxane prepolymer liquid composition.

Monomers for use in the present invention include, for example, monomers according to formula I $$R^1_a SiX_{4-a} \qquad \text{I}$$

and formula II $$R^2_b SiX_{4-b} \qquad \text{II}$$

wherein $R^1$ and $R^2$ are independently selected from the group consisting of hydrogen, linear and branched alkyl and cycloalkyl, alkenyl, alkynyl, (alk)acrylate, epoxy, allyl, vinyl and alkoxy and aryl having 1 to 6 rings;

each X represents independently a hydrolysable group or a hydrocarbon residue; and a and b is an integer 1 to 3;

and monomers of formula III

   III wherein $R^3$ stands for hydrogen, alkyl or cycloalkyl which optionally carries one or several substituents, or alkoxy;

each X represents independently a hydrolysable group or a hydrocarbon residue having the same meaning as above; and c is an integer 1 to 3, and monomers of formula VI

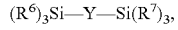   VI wherein $R^6$ and $R^7$ are independently selected from hydrogen and a group consisting of linear or branched alkyl, cycloalkyl, alkenyl, alkynyl, (alk)acrylate, epoxy, allyl, vinyl, alkoxy and aryl having 1 to 6 rings, and wherein the group is substituted or unsubstituted; and Y is a linking group selected from unsubstituted and substituted bivalent aliphatic and aromatic groups, such as alkylene, arylene, —O-alkylene-O—; —O-arylene-O—; alkylene-O-alkylene, arylene-O-arylene; alkylene-$Z^1$C(=O)$Z^2$-alkylene, arylene-$Z^1$C(=O)$Z^2$-arylene and —O-alkylene-$Z^1$(=O)$Z^2$-alkylene-O—; —O-arylene-$Z^1$(=O)$Z^2$-arylene-O—, wherein $Z^1$ and $Z^2$ are each selected from a direct bond or —O—.

The monomers are homo- or copolymerized to yield corresponding siloxane polymers.

Optionally the monomers are homo- or copolymerized to yield corresponding siloxane polymers or prepolymers, which can be further cured to yield high-molecular weight coatings.

The present invention also provides a method of producing hybrid siloxane prepolymer compositions, comprising
hydrolysing silane monomer or monomers,
condensating and polymerzing the silane monomers to a siloxane polymer having a molecular weight of about 1500 to 150,000 g/mol, and
incorporating solvent or solvents and optionally additive(s) for the siloxane polymer, in order to formulate a siloxane prepolymer liquid composition The present invention further provides a method of using the hybrid siloxane prepolymer composition in as anti-smudge/easy-to-clean and anti-reflection hard coating layer, comprising
optionally adjusting the solid content of the hybrid siloxane prepolymer composition material to the required film thickness of the deposited film and selecting the proper solvent for a specific coating method,
optionally adding photoactive or thermally active additives or catalysts to the composition,
depositing the composition on a substrate to form a layer having a film thicknesses of 5 nm-30 μm,
optionally heat treating the deposited film,
optionally subjecting the deposited material layer to UV exposure,
optionally removing the non-exposed areas of the film in a development step, by contacting the layer with an aqueous basic developer solution, and
optionally heat treating/curing the exposed material.

The present invention provides a method for making a coated glass, comprising:
providing glass to be coated;
coating the glass with a liquid phase coating;
thermally curing and/or UV hardening the coating on the glass;
wherein the coated glass comprises a polymer having silicon, oxygen and carbon in the backbone, and wherein the coating on the glass has a refractive index of 1.22 to 1.7, a pencil hardness of 6H or more preferably 8H or more, and an oil contact angle of 30 degrees or more.

The present invention also provides a method, which can be combined with the previous, for making a coated glass, comprising:
providing glass to be coated;
coating the glass with a liquid phase coating;
baking and/or UV hardening the coating on the glass;
wherein the coating to be deposited by liquid phase coating is formed by combining:
a first monomer having the chemical formula $R^{11}_xR^{12}_ySiC_3H_6R^{13}$, wherein $R^{11}$ is an alkoxy, acetoxy or chloro group and where x is 2 or 3, and wherein $R^{12}$ is an alkyl group where y is 0 or 1, and wherein $R^{13}$ is an epoxy, acrylate, methacrylate, (substituted) phenyl or isocyanate group;
a second monomer having the chemical formula $R^{14a}R^{15b}SiC_2H_4(CF)_n$, wherein $R^{14}$ is an alkoxy, acetoxy or chloro group and where a is 2 or 3, and wherein $R^{15}$ is an alkyl group where b is 0 or 1, and wherein n is an integer from 3 to 25; and
a third monomer having the chemical formula $R^{16c}R^{17d}SiC_2H_4SiR^{18e}R^{19f}$, wherein $R^{16}$ is a an alkoxy, acetoxy or chloro group and wherein c=2 or 3, wherein $R^{17}$ is an alkyl group or H and wherein d=0 or 1, wherein $R^{18}$ is an alkoxy, acetoxy or chloro group and wherein e=2 or 3, and wherein $R^{19}$ is an alkyl group or H and wherein f=0 or 1.

Formula $R^{16c}R^{17d}SiC_2H_4SiR^{18e}R^{19f}$ represents a subformula for compounds included in general formula VI mentioned above.

The present invention provides a method of increasing the anti-reflectivity, hardness and oleophobicity of a display, a computer or personal communication device having a touch sensitive screen, comprising:
polymerizing a plurality of monomers that comprise silicon, oxygen and carbon so as to form a carbosiloxane polymer with a molecular weight of at least 2000;
depositing the carbosiloxane polymer with a liquid phase process at atmospheric pressure on a glass substrate;
wherein after hardening the polymer on the glass substrate, the carbosiloxane polymer has a hardness of at least 6H, a refractive index of from 1.22 to 1.46, and an oil contact angle of at least 30 degrees;
further providing a central processing unit (CPU), a display, a touch sensor layer, and a housing so as to form a the computer or personal communication device with a touch sensitive screen;
wherein the properties of antireflectivity reduces surface reflection with over 15%, preferably 20% or more compared to the same glass substrate without the carbosiloxane polymer layer.

The present invention provides computer or personal communication device, comprising a housing; a central processing unit (CPU); and a display; wherein the display comprises; an array of optical elements; a touch sensor; and a glass cover having a coating that is durable antireflective and oleophobic; wherein the coating is a polymer comprising silicon, carbon, oxygen and fluorine, and wherein the atom % of silicon is from 10 to 30, the atomic % of carbon is from 10 to 60, the atomic % of oxygen is from 10 to 60, and the atomic % of fluorine is from 0.1 to 10.

More specifically, the computer device according to the present invention is characterized by what is stated in the characterizing part of claim 1.

The glass substrate having an antireflective and oleophobic hard coating is characterized by what is stated in the charactering part of claim 10.

The display with a touch sensitive screen is characterized by what is stated in the characterizing part of claim 22.

The methods for making coated glass is characterized by what is stated in the characterizing parts of claims 38 and 43.

The method of increasing the hardness and oleophobicity of a computer or personal communication device having a touch sensitive screen is characterized by what is stated in the characterizing part of claim 53.

The computer or personal communication device, with a display having a glass cover and exhibiting a coating that is antireflective and oleophobic is characterized by what is stated in the characterizing part of claim 62.

The compositions are characterized by what is stated in the characterizing part of claim 80.

Considerable advantages are obtained by the invention. Thus, the invention provides material compositions that are thermally curable and/or optionally irradiation curable. The material compositions can be cured at relatively low processing temperatures e.g. at a temperature of max 375° C. or even at temperature of 100° C.

The patterning of the films can be performed via direct lithographic patterning, conventional lithographic masking and etching procedure, imprinting and embossing, but are not limited to these.

The material composition suitable to be used with different glass types. These include thick glass and thin glass and also chemically tempered and thermally tempered glass. The material compositions can also be used on various substrates, such as metal and of polymer materials, in particular thermoplastic films and sheets.

In case of chemically tempered glass it is highly advantageous to have a coating composition of the present kind which can be cured at temperature of 350° C. or preferable at temperature below 250° C. or below 200° C. The same low temperature requirement applies in case of the chemically tempered glass as well when the coating is applied after thermal tempering of the glass.

The present invention provides in addition to anti-smudge and easy-to-clean properties and antireflective properties also increased mechanical stability for thin and thick glass substrate surfaces. The highly mechanically stabile coating material protects the glass substrate from external damage.

Due to the chemically and physically homogenous nature of the coating, the mechanical durability and long-term stability of the anti-smudge and easy-to-clean properties and antireflective properties is achieved and sustained.

The present invention provides a glass substrate having an antireflective and mechanical durability and long-term stability of the anti-smudge and easy-to-clean properties, wherein the coating is a polymer having silicon, oxygen, carbon in the backbone, and wherein the coating has a refractive index of 1.22 to 1.55, a pencil hardness of 8H or more, water contact angle of 70 degrees or more and an oil contact angle of 30 degrees or more. Furthermore, specifically the coating has durability properties where the water contact angle is retained above 65 degrees after 5000 cycles of steel-wool (0000-type) taber abrasion test (measured before and after the test).

Furthermore, specifically the coating has durability properties where the water contact angle is retained above 65 degrees after 200 000 cycles of cheesecloth/cotton cloth taber abrasion test.

The present invention also provides a glass substrate having an antireflective and mechanical durability and long-term stability of the anti-smudge and easy-to-clean properties, wherein the coating is a polymer having silicon, oxygen, carbon and fluorine in the backbone, and wherein the coating has a refractive index of 1.22 to 1.5, a pencil hardness of 8H or more, water contact angle of 90 degrees or more and preferably 100 degrees or more and an oil contact angle of 35 degrees or more preferably 45 degrees or more. Furthermore, specifically the coating has durability properties where the water contact angle is retained above 90 degrees or preferably over 100 degrees after 5000 cycles of steel-wool (0000-type) taber abrasion test (measured before and after the test). Furthermore, specifically the coating has durability properties where the water contact angle is retained above 90 or preferably over 100 degrees after 200 000 cycles of cheesecloth/cotton cloth taber abrasion test.

Coatings which are chemically and physically homogenous throughout the full coating thickness are also provided. Furthermore the present prepolymer coating solutions are capable of yielding coating thicknesses (of the coating films) from 5 nm to 30 μm, more preferably 20 nm-3 μm or specifically 50 nm-1 μm.

EMBODIMENTS

Figure 1:
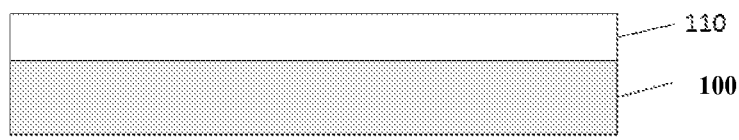
FIG. 1 shows the cross-section of a substrate 100 and material film 110.

As discussed above, the present invention relates to synthesis and polymerization of a hybrid organic-inorganic siloxane polymer compositions that have properties which make them suitable for use as anti-smudge/easy-to-clean and anti-reflection coating layer on the device substrate surfaces.

In the present invention, "alkyl" typically stands for linear or branched alkyl group(s) having 1 to 10, preferably 1 to 8, for example 1 to 6 carbon atoms, such as 1 to 4 carbon atoms, and optionally exhibiting typically 1 to 5 substitutents. Such substituents can be selected, for example, from the group of halogen, hydroxyl, vinyl, epoxy and allyl.

In "alkoxy" and in the bivalent "alkylene" groups and other similar aliphatic groups, the alkyl residue (or residue derived from an alkyl moiety) has the same meaning as above, i.e. stands for the same number of carbon atoms (1 to 10, preferably 1 to 8, or 1 to 6 or even 1 to 4), and contains substituents as explained in the foregoing. Examples of unsubstituted alkylene groups include ethylene and methylene and propylene.

"Arylene" stands for an aromatic bivalent group containing typically 1 to 3 aromatic rings, and 6 to 18 carbon atoms. Such groups are exemplified by phenylene (e.g. 1,4- and 1,3-phenylene) and biphenylene groups as well as naphthylene or anthracenylene groups.

The alkylene and arylene groups can optionally be substituted with, for example, 1 to 5 substituents selected from hydroxy, halo, vinyl, epoxy and allyl groups as well as alkyl, aryl and aralkyl groups.

Preferred alkoxy groups contain 1 to 4 carbon atoms. Examples are methoxy and ethoxy.

The term "phenyl" includes substituted phenyls such as phenyltrialkoxy, in particular phenyltrimethoxy or triethoxy, and perfluorophenyl. The phenyl as well as other aromatic or alicyclic groups can be coupled directly to a silicon atom or they can be coupled to a silicon atom via a methylene or ethylene bridge.

The novel polymer materials will be discussed below in greater detail. However, generally it can be noted that suitable materials for antireflective anti-smudge/easy-to-clean coatings are obtained by polymerizing a plurality of silicon containing monomers. Typically, at least one of the monomers contains silicon and oxygen, and another of the monomers contains silicon and carbon. There are at least some organic groups selected from lower alkyl groups, such as methyl groups, in the monomers.

In one embodiment, new material compositions are provided which have suitable properties to be used as single layer coatings for achieving the desired combinations of properties on glass surfaces or plastic surfaces.

In another embodiment, material compositions are provided that can be cured at relatively low processing temperatures e.g. at a temperature of max 350° C. or even at a temperature of about 70 to 100° C., which makes it possible for the material films or structures to be cured at a low temperature, such as chemically tempered glass and plastics/polymers.

Alternatively, in a further embodiment, material compositions are provided that can be cured at temperatures up to 350° C., or even up to 800° C., which makes it possible for the material films or structures to be cured at a high temperature curing, such as tempering of the glass.

In particularly interesting embodiments, material compositions are achieved which produce optically good quality coatings on curved glass or plastics or bendable/flexible surfaces, whereas the coating has the mechanical properties to allow such bending/flexing.

The polymer compositions are preferably thermally curable and/or optionally irradiation curable materials. The patterning of the films can be performed via direct lithographic patterning, conventional lithographic masking and etching procedure, imprinting and embossing, ink-jet printing, 3D/4D printing, but are not limited to these.

Thermal curing can be done in a conventional oven, IR oven, tempering furnace, or by blow dry or similar. The curing may involve pre-curing stage where the carrier solvent (in-case when used) is removed at least partially by an additional heat curing or vacuum or blow dry step.

The present embodiments do not discriminate between different glass types. These include thick glass and thin glass and also non-tempered, chemically tempered and thermally tempered glass. Generally, the thickness of the glass is usually 5 mm or less, in particular 4 mm or less, typically 3.2 mm or less, in some embodiment 3 mm or less, and for example 2 mm or less, or in some embodiment even 0.8 mm and 0.5 mm or less.

In case of chemically tempered glass it is necessary to have a coating composition which can be cured at temperature of 350° C. or preferable at temperature below 250° C. The same low temperature requirement applies in case of the thermally tempered glass, when the coating is applied after the tempering of the glass.

In a still further embodiment, material compositions are achieved capable of forming a smooth and uniform coating surface to prevent dirt accumulation. The average surface roughness (Ra) of the coating should be between 0.5 nm to 5.0 nm and preferably below 4.0 nm.

Embodiments also comprise applications that give rise to a coating surface, typically smooth and uniform, which after curing has a water contact angle of over 90°, preferably in excess of 100°, which further prevent dirt accumulation together with the effect from the surface morphology resulting in a combined effect.

Typically, the water contact angle is at maximum about 120 degrees.

Embodiments comprise applications that give rise to a coating surface, typically smooth and uniform, which after curing has an oil contact angle of over 20°, preferably over 25°, in particular 30° or more.

Typically, the oil contact angle is at maximum about 80 degrees.

As regards hardness of the coatings, including all of the above disclosed various embodiments, the present technology generally provides coating layers which, after curing, exhibit a pencil hardness of 3H-9H, more preferably 8H or more.

The above parameters are determined by standardized methods as explained below in connection with the examples (cf. Example 25). Thus, for example, the oil contact angle can be measured by placing a drop of n-hexadecane on the surface of the cover and measuring the contact angle thereof.

In one embodiment, the siloxane polymer deposited on the glass substrate has, after curing, a molecular weight of from 60,000 to 120,000 g/mol.

In one embodiment, the siloxane prepolymer deposited on the glass substrate has a molecular weight of from 2000 to 15000 g/mol.

In one embodiment, the siloxane polymer deposited on the substrate has after curing a molecular weight of 50,000 g/mol to 1,000,000 g/mol, in particular about 75,000 to 500,000 g/mol.

In one embodiment, which can be combined with any of the above embodiments, the coating layer has a thickness of about 80 nm to 1 µm, in particular about 90 nm to 600 nm.

In general, the present material compositions provide coating layer which are essentially amorphous.

The present polymers comprise bisilane monomers (monomers typically meeting formula VI), optionally copolymerized with monomers of any of formulas I to III.

The polymer material can be formed by compositions which may comprise mixtures of polymers consisting of or predominantly composed of polymers of formulas VI (bisilanes) and polymers consisting of or predominantly composed of polymers of one or several of formulas I to III.

In both of the above embodiments, the mole-% of residues of monomers of formula VI is 90 to 100 mole-% of the total polymer of the polymers or polymer composition.

Thus, in one embodiment, the polymer or polymer composition comprises 100 mole-% residues of monomer(s) of formula VI.

In another embodiment, the composition comprises up to 10 mole-% of residues of monomer(s) of formulas I to III. At least 90 mole-% of the composition is formed by monomers of formula VI.

In another embodiment, the composition comprises up to 5% of residues from monomer(s) of formulas with "active group capable for crosslinking" (during curing of the film either by thermal or radiation initiation) and 5 mole-% of residues of monomer(s) of formulas I to III (which cannot crosslink due thermal or radiation initiation);

At least 90 mole-% of the composition is formed by monomers of formula VI.

"Composition" is used for designate both homopolymers or copolymers as such as well as homo- or copolymers blended or compounded with other polymers and/or other components.

The polymers or polymer compositions according to preferred embodiments will give rise to coatings which typically exhibit a combination of surface hardness of 8H or more, a water contact angle of 90° or more and an oil contact angle of 35° or more.

The precursor molecules of the siloxane polymers can be tetra-, tri-, di-, or mono-functional molecules. A tetra-functional molecule has four hydrolysable groups; a tri-functional molecule has three hydrolysable groups; a di-functional molecule has two; and mono-functional molecule has one. The precursor molecules, i.e. silane monomers can be have organic functionalities. The precursor molecules can be also bi-silanes.

In particular the present technology provides methods of the using these hybrid organic-inorganic siloxane polymer compositions as coating solutions to provide the anti-smudge/easy-to-clean and anti-reflection properties in a single coating layer on the device substrate surfaces. The liquid phase coating solution is formulated using the polymer, a solvent or a solvent mixture, optionally additives or catalysts and additional processing aids, if necessary.

The wet chemical coating is prepared from this coating solution by any typical liquid application (coating) processes, preferably with spin-on, dip, spray, ink-jet, roll-to-roll, gravure, flexo-graphic, curtain, drip, roller, screen printing coating methods, extrusion coating and slit coating, but are not limited to these. After the final curing process step, the coating shows excellent mechanical coating properties, including adhesion and hardness, i.e., scratch and wear resistance, together with excellent resistance against various essential environmental conditions, both enabling its use in demanding applications applied as a very thin layer on thin glass.

From a chemical point of view, the present coatings show moderate hydrophobic and oleophobic characteristics, in balance, homogeneously through the coating matrix.

In particular for fingerprints visibility, especially after attempts of their removal, a balance between these characteristics is desirable in view of the long-term effect of the coating. The more oleophobic the coating is, the more visible the fingerprints will be, and therefore this invention differs essentially from earlier technical solutions that emphasize high water/oil contact angle as a measure of good anti-fingerprint properties.

Moreover, the coating layer is a single layer system that is built up so that it shows optically optimized anti-reflective characteristics, in addition to the anti-smudge/easy-to-clean properties. Due to the tuned chemical composition and anti-reflectivity, together with the chemical homogeneity and thin physical character of the coating, the clear nature and the color repeatability of the glass is sustained, highly preferred in the field of the applications. Due to the chemically and physically homogenous nature of the coating, the mechanical durability is achieved, and long-term time frame of the effect is sustained.

In one embodiment, the present material is suitable for curved/flexible thin film glass or plastic surfaces which have such mechanical properties that bending of the substrate does not damage the coating or the substrate. These properties are provided in addition to the above-mentioned properties of anti-smudge and/or easy-to-clean, and antireflective coating properties.

In one embodiment, material compositions are provided that give a refractive index of 1.5 to 1.2 and preferably 1.46 to 1.25 at 632 nm.

In one embodiment, material compositions are provided that have a water contact angle of at least 65° and a contact angle of oil of at least 30°.

One embodiment concerns a method of making coated glass, wherein a glass to be coated is provided and coated with a liquid phase coating. Then the coating on the glass is thermally cured and/or UV hardened. The coating on the glass comprises a polymer having silicon, oxygen and carbon in the backbone, and wherein the coating on the glass has a refractive index of 1.22 to 1.7, a pencil hardness of 6H or more, and an oil contact angle of 20 degrees or more.

In particular the oil contact angle is 35 degrees or more, and optionally the pencil hardness is 7H or more, such as 8H or more.

The coating on the glass is for example at a thickness of from 15 to 180 nm, preferably 50 to 120 nm.

The coating or optical layer further comprises fluorine. The atom % of silicon is from 10 to 30, for example 15 to 25, the atomic % of carbon is from 10 to 60, for example 30 to 40, the atomic % of oxygen is from 10 to 60, for example 30 to 40, and the atomic % of fluorine is from 0.1 to 10, for example 1 to 5.

According to one embodiment, the process according to the invention comprises hydrolyzing and polymerizing a monomers according to either or both of formulas I and II:

$$R^1{}_a SiX_{4-a} \qquad\qquad I$$

and

$$R^2{}_b SiX_{4-b} \qquad\qquad II$$

wherein $R^1$ and $R^2$ are independently selected from the group consisting of hydrogen, linear and branched alkyl and cycloalkyl, alkenyl, alkynyl, (alk)acrylate, epoxy, allyl, vinyl and alkoxy and aryl having 1 to 6 rings;

each X represents independently a hydrolysable group or a hydrocarbon residue; and a and b is an integer 1 to 3.

Further, in combination with monomers of formula I or II or as such at least one monomer corresponding to Formula III can be employed:

$$R^3{}_c SiX_{4-c} \qquad\qquad III$$

wherein $R^3$ stands for hydrogen, alkyl or cycloalkyl which optionally carries one or several substituents, such as halo (e.g. fluoro), or alkoxy;

each X represents independently a hydrolysable group or a hydrocarbon residue having the same meaning as above; and c is an integer 1 to 3.

In any of the formulas above, the hydrolysable group is in particular an alkoxy group (cf. formula IV).

As discussed above, the present invention provides for the production of organosiloxane polymers using tri- or tetraalkoxysilane. The alkoxy groups of the silane can be identical or different and preferably selected from the group of radicals having the formula $$—O—R^4 \qquad\qquad IV$$

wherein $R^4$ stands for a linear or branched alkyl group having 1 to 10, preferably 1 to 6 carbon atoms, and optionally exhibiting one or two substitutents selected from the group of halogen, hydroxyl, vinyl, epoxy and allyl.

In one embodiment, the present method comprises using at least one bisilane monomer for producing a homopolymer, or a copolymer together with other monomers, for example such as one or more of the ones according to formulas I to III, or for producing a homopolymer or copolymer, which is blended or compounded with polymers not containing said bisilane monomer.

According to a preferable embodiment the bisilane is preferably selected from molecules corresponding to formula VI:

$$(R^6)_3Si—Y—Si(R^7)_3, \qquad\qquad VI$$

wherein $R^6$ and $R^7$ are independently selected from hydrogen and a group consisting of linear or branched alkyl, cycloalkyl, alkenyl, alkynyl, (alk)acrylate, epoxy, allyl, vinyl, alkoxy and aryl having 1 to 6 rings, and wherein the group is substituted or unsubstituted; and Y is a linking group selected from unsubstituted and substituted bivalent aliphatic and aromatic groups, such as alkylene, arylene, —O-alkylene-O—; —O-arylene-O—; alkylene-O-alkylene, arylene-O-arylene; alkylene-$Z^1$C(=O)$Z^2$-alkylene, arylene-$Z^1$C(=O)$Z^2$-arylene and —O-alkylene-$Z^1$(=O)$Z^2$-alkylene-O—; —O-arylene-$Z^1$(=O)$Z^2$-arylene-O—, wherein $Z^1$ and $Z^2$ are each selected from a direct bond or —O—.

A composition of the above kind, with polymers containing moieties of monomers of formulas I to III and VI in the above mentioned ratios, can be used in the present devices, on glass substrates, and in displays as well as in other products and methods herein disclosed.

Another useful composition comprises a hybrid organic-inorganic material having an inorganic portion comprising silicon, oxygen and carbon, and further comprising an organic portion with organic groups connected to the inorganic portion, said material comprising or consisting essentially of polymers obtained from polymerization of monomers according to formula VI:

$$(R^6)_3Si—Y—Si(R^7)_3, \qquad\qquad VI$$

wherein $R^6$ and $R^7$ are independently selected from hydrogen and a group consisting of linear or branched alkyl, cycloalkyl, alkenyl, alkynyl, (alk)acrylate, epoxy, allyl, vinyl, alkoxy and aryl having 1 to 6 rings, and wherein the group is substituted or unsubstituted; and Y is a linking group selected from unsubstituted and substituted bivalent aliphatic and aromatic groups, such as alkylene, arylene, —O-alkylene-O—; —O-arylene-O—; alkylene-O-alkylene, arylene-O-arylene; alkylene-$Z^1$C(=O)$Z^2$-alkylene, arylene-$Z^1$C(=O)$Z^2$-arylene and —O-alkylene-$Z^1$(=O)$Z^2$-alkylene-O—; —O-arylene-$Z^1$(=O)$Z^2$-arylene-O—, wherein $Z^1$ and $Z^2$ are each selected from a direct bond or —O—.

This composition which comprises a polymer comprising or consisting essentially of monomer residues of formula VI can be used in the present devices, on glass substrates and in displays as well as in other products and methods herein disclosed.

A method, for instance, for making a coated glass, for example of the above kind, comprises in one embodiment a coating deposited by liquid phase coating, obtained by combining a first monomer having the formula $$R^{11}{}_xR^{12}{}_ySiC_3H_6R^{13} \qquad\qquad VII$$

wherein $R^{11}$ is an alkoxy, acetoxy or chloro group and x is 2 or 3, $R^{12}$ is an alkyl group where y is 0 or 1, and $R^{13}$ is an epoxy, acrylate, methacrylate, phenyl or isocyanate group;

a second monomer having the formula $$R^{14a}R^{15b}SiC_2H_4(CF)_n \qquad\qquad VIII$$

wherein $R^{14}$ is an alkoxy, acetoxy or chloro group and where a is 2 or 3, $R^{15}$ is an alkyl group where b is 0 or 1, and n is an integer from 3 to 25; and a third monomer having the formula $$R^{16c}R^{17d}SiC_2H_4SiR^{18e}R^{19f} \qquad\qquad IX$$

wherein $R^{16}$ is a an alkoxy, acetoxy or chloro group and c=2 or 3, $R^{17}$ is an alkyl group or H and d=0 or 1, $R^{18}$ is an alkoxy, acetoxy or chloro group and e=2 or 3, and $R^{19}$ is an alkyl group or H and wherein f=0 or 1.

Preferably the first monomer is provided at 0 to 50 weight %, the second monomer is provided at greater than 50 weight %, and the third monomer is provided at 1 to 20 weight %.

Substituent $R^{13}$ is preferably epoxy.

In an embodiment, the second monomer has the formula $R^{14a}R^{15b}SiC_2H_4(CF)_n$, (VII), wherein $R^{14}$ is an alkoxy group and wherein a is 3 and n is an integer from 3 to 25.

In an embodiment, the second monomer has the chemical formula $R^{14a}K^{15b}SiC_2H_4(CF)_n$, (VII) wherein $R^{15}$ is a methyl group and n has the same meaning as above.

For example, $R^{14}$ can be a methoxy or ethoxy group, and a take the value 3.

Preferably, in the above formulas VII to IX, n is selected from 3, 9, 13 and 17, in particular 13 or 17.

The second monomer can be provided both as first and second variations, wherein in the first variation n is 3 or 9, and in the second variation n is 13, 17 or 25.

After baking and/or UV hardening of the coating on the glass, the thickness of the coating is from 15 to 180 nm, the thickness of the coating preferably being from 50 to 120 nm. The coating on the glass has a refractive index of 1.22 to 1.7.

An embodiment comprises a method of increasing the hardness and oleophobicity of a display, a computer or personal communication device having a touch sensitive screen, comprising the steps of polymerizing a plurality of monomers that comprise silicon, oxygen and carbon so as to form a carbosiloxane polymer with a molecular weight of at least 2000;

depositing the carbosiloxane polymer with a liquid phase process at atmospheric pressure on a glass substrate;

wherein after hardening the polymer on the glass substrate, the carbosiloxane polymer has a hardness of at least 6H, a refractive index of from 1.22 to 1.46, and an oil contact angle of at least 20 degrees.

Further then there is provided a central processing unit (CPU), a display, a touch sensor layer, and a housing so as to form a the computer or personal communication device with a touch sensitive screen;

wherein the properties of antireflectivity reduces surface reflection with over 15%, preferably 20% or more compared to the same glass substrate without the carbosiloxane polymer layer.

In one embodiment, the amount of sunlight reflected from the glass substrate is typically at least 3% less, preferably at least 3.5% less, when coating is deposited and cured on both sides of the cover substrate.

In an example of the embodiment, the polymer further comprises fluorine, and wherein the atom % of silicon is from 10 to 30, for example 15 to 25, the atomic % of carbon is from 10 to 60, for example 30 to 40, the atomic % of oxygen is from 10 to 60, for example 30 to 40, and the atomic % of fluorine is from 1 to 40, for example 1 to 15.

The polymer can be deposited on both first and second sides of the glass substrate.

Generally, after hardening of the polymer on the glass substrate, the carbosiloxane polymer layer has a thickness of from 15 to 180 nm, for example 50 to 120 nm.

The above precursor molecules are condensation polymerized to achieve the final siloxane polymer composition. Generally, in case of tri-, di- and mono-functional molecules, the other functional groups (depending on the number of hydrolysable group number) of the precursor molecules can be organic functionalities such as linear, aryl, cyclic, aliphatic groups. These organic groups can also contain reactive functional groups e.g. amine, epoxy, acryloxy, allyl or vinyl groups. These reactive organic groups can optionally react during the thermal or radiation initiated curing step. Thermal and radiation sensitive initiators can be used to achieve specific curing properties from the material composition.

Particularly suitable monomers are selected from the group of triethoxysilane, tetraethoxysilane, tetramethoxysilane, methyltrimethoxysilane, methyltriethoxysilane, ethyltriethoxysilane, n-butyltriethoxysilane, methyldiethoxyvinylsilane, n-octadecyltriethoxysilane, dimethyldiethoxysilane, vinyltriethoxysilane, vinylmethyldimethoxysilane, phenyltrimethoxysilane, phenantrene-9-triethoxysilane, vinyltrimethoxysilane, 3-glysidoxypropyltrimethoxysilane, aminopropyltrimethoxysilane, methacryloxypropyltrimethoxysilane, methacryloxypropyltriethoxysilane, acryloxypropyl-trimethoxysilane, allyltrimethoxysilane, epoxycyclohexylethyltrimethoxysilane, diphenylsilanediol, 1,2-bis(trimethoxysilyl)methane, 1,2-bis(trimethoxysilyl)ethane, glycidylmethacrylate, dimethyldimethoxysilane, 1-(2-(Trimethoxysilyl)ethyl)cyclohexane-3,4-epoxide, 1,2-bis(triethoxysilyl)ethane, 1H,1H,2H,2H-Perfluorooctyltriethoxysilane, (Heptadecafluoro-1,1,2,2-tetra-hydrodecyl)trimethoxysilane, tridecafluorotriethoxysilane, 1H, 1H, 2H, 2H-perfluorodecyltrimethoxysilane, pentafluorostyrenyltrimethoxysilane, trimethoxy(3,3,3-trifluoropropyl)silane and mixtures thereof.

In an embodiment, polymeric compositions are provided which contain residues of monomers of formula I and formula II and formula III—either one, two or three—and formula VI at a molar ratio of (monomers of formulas I and/or II and/or III calculated together): (monomers of formula VI) of 60:40 to 0.1:100, in particular 50:50 to 0.1:100, for example about 10:90 to 0.1:100.

In one embodiment, the molar ratio of monomers of formula VI to the sum of monomers of one, two or three of monomers according to formulas I to IIII, is 100:50-99:1. Exemplary bisilanes (for instance of formula VI) include 1,2-bis(trimethoxysilyl)methane, 1,2-bis(triethoxysilyl)methane, 1,2-bis(trimethoxysilyl)ethane, 1,2-bis(triethoxysilyl)ethane, 1-(dimethoxymethylsilyl)-1-(trimethoxysilyl)methane, 1-(diethoxymethylsilyl)-1-(triethoxysilyl)methane, 1-(trimethoxymethylsilyl)-2-(dimethoxysilyl)ethane, 1-(dimethoxymethylsilyl)-2-(trimethoxysilyl)ethane, 1-(diethoxymethylsilyl)-2-(triethoxysilyl)ethane, bis(dimethoxymethylsilyl)methane, bis(diethoxymethylsilyl)methane, 1,2-bis(dichloromethylsilyl)ethane, 1,2-bis(trichlorosilyl)ethane, 1,2-bis(dimethoxymethylsilyl)ethane, 1,2-bis(diethoxymethylsilyl)ethane, 1,2-bis(trimethoxysilyl)benzene, 1,2-bis(triethoxysilyl)benzene, 1,3-bis(trimethoxysilyl)benzene, 1,3-bis(triethoxysilyl)benzene, 1,4-bis(trimethoxysilyl)benzene, 1,4-bis(triethoxysilyl)benzene, 4,4'-Bis(triethoxysilyl)-1,1'-biphenyl, 1,4-Bis(triethoxysilyl)benzene, and 1,3-Bis(triethoxysilyl)benzene and combinations thereof.

In one embodiment, a monomer of Formula VI is homopolymerized or a mixture of monomers of Formulas VI are copolymerized to yield a polymer.

In the present context, the term "polymer" will be used both for homo- and copolymers.

Based on the above, and as will appear from the below examples, the present technology comprises an embodiment, wherein at least one or several monomers of formulas I to III is homopolymerized or are copolymerized, preferably by first hydrolysing the monomers and then condensation polymerizing them, to form a first homo- or copolymer containing residues of monomers having a formula I to III; and at least one monomer of formula VI is is homopolymerized or are copolymerized, preferably by first hydrolysing the monomers and then condensation polymerizing them, to form a homo- or copolymer containing residues of monomers having formula VI; and mixing the such obtained first and second polymers to form a polymer blend.

As also will appear from the below examples, the present technology comprises another embodiment, wherein at least one monomer of formula I to III and at least one monomer of formula VI are copolymerized, preferably by first hydrolysing the monomers and then condensation polymerizing them, to form a copolymer containing residues of monomers having a formula I to III and VI.

In one further embodiment which is applicable to the above methods, the hydrolysation and condensation polymerization or copolymerization of at least one monomer, preferably 2 or more monomers, of formulas I to III and VI, and combinations thereof, is carried out such that hydrolysation is performed at a pH of less than 2, the organic phase containing the monomer is washed with water or an aqueous solution, then the washed organic phase is treated with an alkaline agent, such as an amine, at a pH in excess of 11, and finally the organic phase thus obtained is washed with water to adjust pH to a value in the range of 7 to 9.

It has been found that polymers of high molecular weight can be obtained by the afore-going embodiment.

In the present context, the term "polymer" will be used both for homo- and copolymers.

In one embodiment, polymers thus obtained can have a molecular weight in the range of 300 up to 1,500,000 g/mol, typically about 400 to 1,000,000 g/mol or 400 to 500,000 g/mol.

In one embodiment, the polymers obtained have a molecular weight of about 300 to 20,000 g/mol, typically 500 to 10,000 g/mol. Thus they are useful as prepolymers which after deposition are capable of being cured to yield a final polymer having a molecular weight of about 30,000 to 500,000 g/mol.

According to one embodiment, the siloxane composition comprises a siloxane polymer in a solvent phase, wherein
the partially cross-linked prepolymer has a siloxane backbone formed by repeating —Si—O— units and having a molecular weight in the range of from about 2,000 to about 20,000 g/mol, the siloxane backbone exhibiting hydroxyl groups in an amount of about 5 to 70% of the —Si—O— units and further exhibiting epoxy groups in an amount of 1 to 40 mol %, calculated from the amount of repeating units; and
the composition further comprises 0.1-3%, based on the weight of the solid matter, at least one cationic photo reactive compound.

The synthesis of the siloxane polymer is carried out in two steps. In the first synthesis step, in the following also called the hydrolysis step, the precursor molecules are hydrolyzed in presence typically of water and a catalyst, such as hydrochloric acid or nitric acid or another mineral or organic acid or a base, and in the second step, the polymerization step, the molecular weight of the material is increased by condensation polymerization or other crosslinking depending on what precursors are chosen to the synthesis. The water used in the hydrolysis step has typically a pH of less than 7, preferably less than 6, in particular less than 5.

It may be preferable in some cases to carry out the condensation polymerization in the presence of a suitable catalyst. In this step the molecular weight of the prepolymer is increased to facilitate suitable properties of the material and film deposition and processing.

The siloxane polymer synthesis, including the hydrolysis, the condensation and the cross-linking reactions, can be carried out using an inert solvent or inert solvent mixture, such as acetone or PGMEA, "non-inert solvent", such as alcohols, or without a solvent. The used solvent affects the final siloxane polymer composition. The reaction can be carried out in basic, neutral or acidic conditions in the presence of a catalyst. The hydrolysis of the precursors may be done in the presence of water (excess of water, stoichiometric amount of water or sub-stoichiometric amount of water). Heat may be applied during the reaction and refluxing can be used during the reaction.

The shelf life stability of the present prepolymers is typically at least 3 months at room temperature, preferably over 6 months at room temperature.

If necessary, at the conclusion of the prepolymerization step, the polymer is typically stabilized, for example to reach the above shelf life stability requirement, by end-capping the polymer chain, for example by blocking terminal groups, such as hydroxyl groups. Suitable reagents are silyl compounds. These silyl compounds include chlorotrimethylsilane, chloromethylvinylsilane, ethoxytrimethylsilane, ethoxydimethylvinylsilane and methoxytrimethylsilane.

Typically before the further condensation the excess of water is removed from the material and at this stage it is possible to make a solvent exchange to another synthesis solvent if desired. This other synthesis solvent may function as the final or one of the final processing solvents of the siloxane polymer. The residual water and alcohols and other by-products may be removed after the further condensation step is finalized. Additional processing solvent(s) may be added during the formulation step to form the final processing solvent combination. Additives such as thermal initiators, radiation sensitive initiators, surfactants and other additives may be added prior to final filtration of the siloxane polymer. After the formulation of the composition, the polymer is ready for processing.

Suitable solvents for the synthesis are, for example, acetone, tetrahydrofuran (THF), toluene, 1-propanol, 2-propanol, methanol, ethanol, propylene glycol monomethyl ether, propylene glycol propyl ether, methyl-tert-butylether (MTBE), propylene glycol monomethylether acetate (PGMEA), propylene glycol monomethylether PGME and propylene glycol propyl ether (PnP), PNB, IPA, MIBK, Glycol Ethers (Oxitols, Proxitols), Butyl Acetates, MEK Acetate, or mixtures of these solvents or other suitable solvents.

After synthesis, the material is diluted using a proper solvent or solvent combination to give a solid content and coating solution properties which with the selected film deposition method will yield the pre-selected film thickness. Suitable solvents for the formulation are example 1-propanol, 2-propanol, ethanol, propylene glycol monomethyl ether, propylene glycol propyl ether (PNP), methyl-tert-butylether (MTBE), propylene glycol monomethylether acetate (PGMEA), propylene glycol monomethylether PGME and PNB, IPA, MIBK, Glycol Ethers (Oxitols, Proxitols), Butyl Acetates, MEK Acetate, or mixtures of these solvents or other suitable solvents. The final coating film thickness has to be optimized according for each device and structure fabrication process.

Optionally, an initiator or catalyst compound is added to the siloxane composition after synthesis. The initiator, which can be similar to the one added during polymerization, is used for creating a species that can initiate the polymerization of the "active" functional group in the UV curing step. Thus, in case of an epoxy group, cationic or anionic initiators can be used. In case of a group with double bonds as "active" functional group in the synthesized material, radical initiators can be employed. Also thermal initiators (working according to the radical, cationic or anionic mechanism) can be used to facilitate the cross-linking of the "active" functional groups. The choice of a proper combination of the photoinitiators also depends on the used exposure source (wavelength).

The concentration of the photo or thermally reactive compound in the composition is generally about 0.1 to 10%, preferably about 0.5 to 5%, calculated from the mass of the siloxane polymer.

Film thicknesses may range e.g. from 1 nm to 10 µm. Various methods of producing thin films are described in U.S. Pat. No. 7,094,709, the contents of which are herewith incorporated by reference.

A film produced according to the invention typically has an index of refraction lies between 1.2 to 1.9 at a wavelength of 633 nm.

According to an embodiment, the method further comprising admixing micro- or nanoparticles (or similar nano-, or microscale rods, crystals, spheres, dots, buds etc.) to the polymer compositions. The nanoparticles are in particular selected from the group of light scattering pigments, organic and inorganic phosphors, oxides, quantum dots or metals. The above mentioned dopants can improve coating material mechanical, chemical or physical properties or provide added functionality for the layer. The amount of such micro- or nanoparticples can be between 1 and 50 wt-% of the composition.

The attached drawings illustrate embodiments.

Turning first to FIG. 1, which shows a cross-section of a coated substrate, it can be noted that reference numeral shows a substrate 100 on top of which a material coating layer 110 has been arranged.

Figure 3:
FIG. 3 shows the cross-section of a typical sequence for coating deposition and curing to obtain single side coating.
Figure 3:
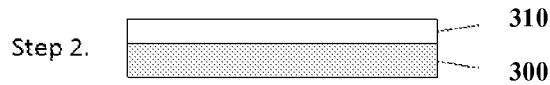
Figure 3:

FIG. 3 shows a typical sequence of the deposition process of the material layer on top of the substrate. Step 1 includes substrate preparation, Step 2 includes the coating process and Step 3 includes the coating curing to its final form.

The substrate marked with reference numerals 100 and 300 in FIGS. 1 and 3 (and the corresponding substrates in the other Figures), can be soda lime glass, borosilicate glass or any other glass substrate type or plastic type with various thicknesses. The substrate can be non-tempered, thermally tempered glass or chemically tempered glass and it can have different surface preparations including polishing, grinding, washing together with or without various surface treatment agents. The substrate surface can be flat or can have a surface texture in it or other layers on the substrate with surface texture or no surface texture in it.

The material coating layer marked with reference numerals 110, 310 in FIGS. 1 and 3 (and the corresponding coating layers in the other Figures) is applied by using a wet chemical coating processes, preferably with spin-on, dip, spray, ink-jet, roll-to-roll, gravure, flexo-graphic, curtain, drip, roller, screen printing coating methods, extrusion coating and slit coating, but are not limited to these. After the wet chemical coating step there is an optional excess solvent removal step followed by a curing step using either thermal curing or UV curing or can be also combination of both. The thermal curing can be performed optionally in combination with the thermal tempering step of the glass.

Figure 2:
FIG. 2 shows the cross-section of a substrate 200 and material films 205 and 210.

FIG. 2 shows the use of an optional coating layer or surface treatment chemical 205 between the substrate 200 and material coating layer 210.

The coating layer 205 can be a primer layer activating the substrate 200 surface to achieve good adhesion between the substrate 200 and material coating layer 210. It can be alternatively also a (patterned or non-patterned) coating layer providing example additional glass corrosion protection, diffusion barrier, conductive or semi-conductive coating layer or optical coating layer playing a role improving the optical properties of the total coating stack.

In alternative arrangement the coating layer 205 can be the actual material coating layer (in this case also additional optional coating layer between the substrate 200 and coating layer 205 can be applied) described in the invention and coating layer 210 can function as the additional surface treatment chemical, primer or a (patterned or non-patterned) coating layer providing example additional glass corrosion protection, diffusion bather, conductive or semi-conductive coating layer and/or optical coating layer playing a role improving the optical properties of the total coating stack. Specifically it can also provide additional increase in the water contact angle and oil contact angle of the material coating layer 205 and total coating stack.

Figure 4A:
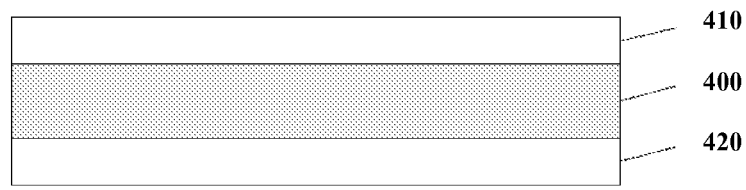
FIG. 4a shows the cross-section of a substrate 400 and material films 410 and 420.
Figure 4B:
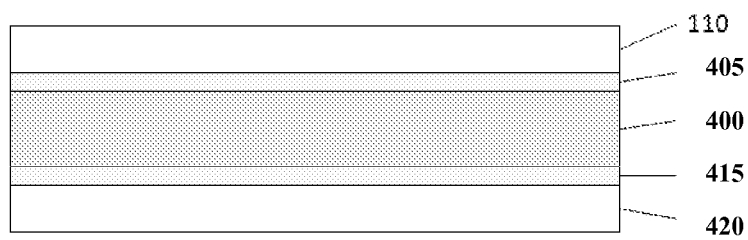
FIG. 4b shows the cross-section of a substrate 400 and material films 405, 410, 415 and 420.
Figure 5:
FIG. 5 shows the cross-section of a typical sequence for coating deposition and curing to obtain double side coating.
Figure 5:
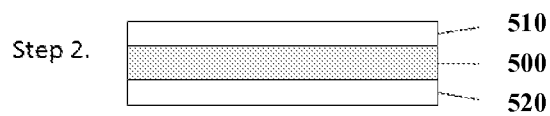
Figure 5:
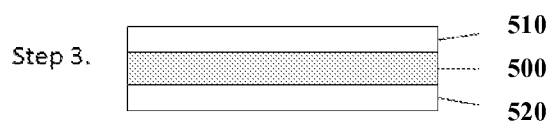

FIGS. 4a and 4b shows, similarly to FIGS. 1 and 2, cross-section representations of a substrate 400 but in this case the substrate is coated double sided with material coating layers 410 and 420. FIG. 5 shows, similarly to FIG. 3, a typical sequence of the deposition process of the material layer double sided on the substrate. Optionally, another coating layer or surface treatment chemical 505 and 515 can be used in between the substrate 500 and material coating layers 510 and 520.

The material coating layers 510 and 520 can be the same coating material or they can be different materials. The optional material coating layers or surface treatment chemicals 505 and 515 can be the same coating material or they can be different materials. If coating layers are different from each other and also depending on the used deposition technique there might be a need to do additional curing of the coating layer in between the deposition of each coating layer (after the wet chemical coating step there is an optional excess solvent removal step followed by a curing step using either thermal curing or UV curing or can be also combination of both. The thermal curing can be performed optionally in combination with the thermal tempering step of the glass).

Figure 6A:
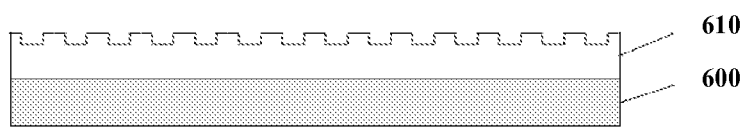
FIG. 6a shows the cross-section of a substrate 600 and patterned/structured material film 610.
Figure 6B:
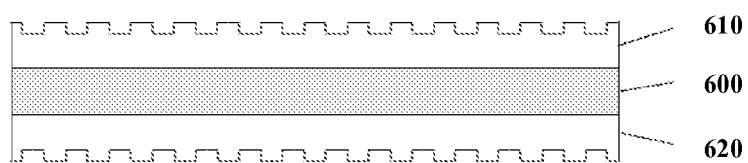
FIG. 6b shows the cross-section of a substrate 600 and patterned/structured material films 610 and 620.

FIG. 6a and FIG. 6b below show cross-section images of a substrate 600 and material coating layer 610 (single sided) and optionally having material coating layer 620 (double sided) on the substrate 600. In addition to the material layer, additional patterning process (nano-imprinting, embossing, roll-to-roll, gravure, flexo-graphic, roller, ink-jet, screen-printing, spray and or UV lithography is used as patterning process) is used the form surface structures (nano-scale or micro or millimeter scale) to the material film to produce additional optical, physical or chemical properties for to the material coating layer or coating layers.

Figure 7:
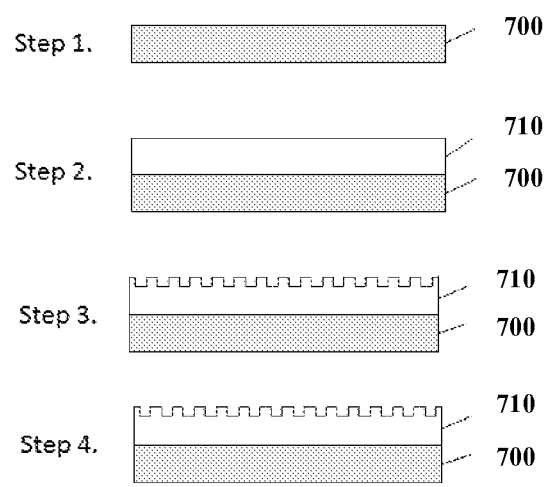
FIG. 7 shows the cross-section of a typical sequence for coating deposition on a substrate 700, patterning and curing to obtain single side, patterned coating 710.

FIG. 7 shows a typical sequence of the deposition and patterning process of the material layer 710 on top of the substrate 700. Step 1 includes substrate preparation, Step 2 includes the coating process, Step 3 includes the patterning process of the material coating (this may include thermal and UV curing or combination of both) and Step 4 includes the coating curing for its final form. Step 2 and Step 3 can be combined as a one single step depending on the deposition and patterning technique. Optionally the layer 720 can be patterned on the rear side. It is also possible to have material layer 710 as non-patterned layer on top and then material layer 720 patterned on the rear side or vice versa.

By means of the invention, materials are provided which are suitable for produce films and structures. The layers can be deposited on various substrate surfaces, such as glass, silicon, silicon nitride, different oxide coating layers, metals and plastics.

The patterning of the thermally and/or irradiation sensitive material compositions can be performed via direct lithographic patterning, conventional lithographic masking and etching procedure, imprinting and embossing, but are not limited to these.

The compositions can be used for making layers which are cured at relatively low processing temperatures, e.g. at a temperature of max 375° C. or even at temperature of 100° C. and in the range between these limits.

However the coating layer formed from the material compositions can also be cured at higher temperatures, i.e. temperatures over 375° C. and up to 400° C., or even up to 800° C., making it possible for the material films or structures to be cured at a high temperature curing, such as tempering of the glass and furthermore can be combined with a subsequent high temperature deposition step, such as sputtering, firing, thermal evaporation and/or a CVD process.

After film deposition (optionally patterning) and curing, the material film and/or structures are capable of withstanding aggressive environmental conditions and has high mechanical durability and chemical stability, through which long-term stability of the anti-smudge and easy-to-clean properties and antireflective properties is achieved and sustained.

In the following, the invention will be illustrated with the aid of a number of non-limiting working examples giving further details of the preparation of the above-discussed siloxane polymer coating compositions and of their use for producing coatings.

Solvent variations required for different applications processes, instead of PNP (propandiol-monopropyl ether) or acetone: PNB (propandiol-monobutyl ether), IPA(2-propanol), MTBE (methyl tert butyl ether), MIBK (methyl isobutyl ketone), Glycol Ethers (Oxitols, Proxitols), Butyl Acetates, MEK Acetate, or mixtures of these solvents or other suitable solvents.

In the examples below, the following abbreviations are used:
MTEOS—Methyltriethoxy silane
GPTMS—3-Glycidoxypropyl-trimethoxysilane
TEA—Triethylamine
MEOS—1,2-Bis(trimethoxysilyl)-ethane
ClSiMe$_3$—Trimethylchlorosilane
TEOS—Tetraethyl silicate
MTMS—Methyl-trimethoxysilane
PTMS—Trimethoxyphenylsilane
TMSPM—3-(Trimethoxysilyl)propyl methacrylate
APTES—(3-Aminopropyl)triethoxysilane
F-17—(Heptadecafluoro-1,1,2,2-tetrahydrodecyl)trimethoxysilane
F13—1H,1H,2H,2H-Perfluorooctyltriethoxysilane Example 1

Nitric acid (0.1 M, 28.50 g) was added to a mixture of MTEOS (18.72 g) and GPTMS (80.00 g) in acetone. The solution was refluxed at 85° C. for 3 h. After reflux, solvent was exchanged to PNP. TEA (0.5 w-% of solids) was added and the material was refluxed for 90 min at 95° C. ClSiMe$_3$ (0.20 g) was added to the material and reflux was continued for additional 20 minutes. Solvent exchange to PNP was done and material was filtrated using 0.45 μm filters. After dilution and formulation material was ready to be used for coating deposition.

Example 2

Nitric acid (3 M, 13.57 g) was added to the mixture of MEOS (17.16 g) and GPTMS (15.00 g) in acetone. The solution was stirred at RT for about 3 h. Solution was washed by water/MTBE, and solvent exchanged to PNP. TEA (8 w-% of solid polymer) was added at RT, and the material was refluxed for 70 min. at 95° C. After reflux material was washed several times by a water/MTBE mixture. After the washing step, solvent exchange to PNP was done. ClSiMe$_3$ (0.13 g; 0.001 mol) was added to the material, which was refluxed for 90 minutes at 105° C. The material was filtrated using 0.45 μm filters. After dilution and formulation material was ready to be used for coating deposition.

Example 3

Nitric acid (22.66 g) was added to the mixture of TEOS (14.12 g), MTMS (10.09 g;) and GPTMS (3.72 g) in 2-propanol. The solution was stirred at RT for about 3 h. Solution was washed with water/MTBE, and solvent exchanged to PNP. TEA (8 w-% of solid polymer) was added and material was refluxed for 40 min at 95° C. After reflux material was washed several times by water/MTBE mixture. After the washing step, solvent exchanged to PNP. The material was filtrated using 0.45 μm filters. After dilution and formulation material was ready to be used for coating deposition.

Example 4

Nitric acid (22.66 g) was added to a mixture of TEOS (14.12 g), MTMS (10.09 g; 0.074 mol) and APTMS (3.49 g) in 2-propanol. The solution was stirred at RT for about 3 h. Solution was washed with water/MTBE, and solvent exchanged to PNP. TEA (8 w-% of solid polymer) was added and the material was refluxed for 40 min at 95° C. After reflux, the material was washed several times with a water/MTBE mixture. After the washing step, solvent exchange to PNP. The material was filtrated using 0.45 μm filters. After dilution and formulation material was ready to be used for coating deposition.

Example 5

A mixture of GPTMS (15.69 g), MEOS (8.96 g) and F-13 (1.02 g) was added to nitric acid (3.65 g) in acetone. The solution was stirred at RT for about 3 h. After stirring, solution was washed with water/MTBE, and solvent exchanged to PNP. TEA (8 w-% of solid polymer) was added and material was refluxed for 40 min at 95° C. After reflux, the material was washed several times with a water/MTBE mixture. After the washing step, solvent was exchanged to PNP, and the material was refluxed with ClSiMe$_3$ (0.11 g) at 105° C. for 90 min. The material was filtrated using 0.45 μm filters. After dilution and formulation material was ready to be used for coating deposition.

Example 6

A mixture of GPTMS (14.18 g), MTEOS (88.21 g) and PTMS (8.92 g) was added to nitric acid (64.76 g) in 2-propanol. The solution was refluxed for 4 h at 95° C. After reflux, solvent was exchanged to PNP. TEA (8 w-% of solid polymer) was added and material was refluxed for 40 min at 95° C. After reflux, the material was washed several times with a water/MTBE mixture. After the washing step, solvent was exchanged to PNP, and the material was refluxed with ClSiMe$_3$ (0.11 g; 0.001 mol) at 105° C. for 90 min. The material was filtrated using 0.45 μm filters. After dilution and formulation material was ready to be used for coating deposition.

Example 7

A mixture of GPTMS (23.13 g) and F-13 (1.02 g) was added to nitric acid (1.32 g) in acetone. The solution was stirred at RT for about 1 h, then refluxed at 95° C. for 2 h 30 min. After reflux, the solution was washed with water/MTBE, and solvent exchanged to 2-propanol. TEA (1 w-% of solid polymer) was added and the material was refluxed for 90 min at 95° C. After reflux, the material was washed several times with a water/MTBE mixture. After the washing step, solvent was exchanged to PNP. The material was filtrated using 0.45 μm filters. After dilution and formulation material was ready to be used for coating deposition.

Example 8

A mixture of TEOS (30.00 g) and MTMS (6.54 g) was added to nitric acid (12.97 g) in 2-propanol. The solution was refluxed at 95° C. for 3 h. After reflux, solution was washed with water/MTBE, and solvent exchanged to 2-propanol. TEA (4 w-% of solid polymer) was added and the material was refluxed for 15 min at 95° C. After reflux, the material was washed several times with a water/MTBE mixture. After the washing step, solvent was exchanged to PNP, and material was refluxed with ClSiMe$_3$ (0.51 g) at 105° C. for 60 min. The material was filtrated using 0.45 µm filters. After dilution and formulation material was ready to be used for coating deposition.

Example 9

A mixture of TEOS (40.00 g) and MTMS (17.44 g) was added to nitric acid (20.75 g) in 2-propanol. The solution was stirred at RT for 3 h 30 min. The solution was washed with water/MTBE, and solvent exchanged to 2-propanol. TEA (8 w-% of solid polymer) was added, and the material was refluxed for 40 min at 95° C. After reflux, the material was washed several times with a water/MTBE mixture. After washing step, solvent was exchanged to PNP, and the material was refluxed with ClSiMe$_3$ (0.10 g; 0.001 mol) at 105° C. for 60 min. The material was filtrated using 0.45 µm filters. After dilution and formulation material was ready to be used for coating deposition.

Example 10

A mixture of GPTMS (14.00 g), MEOS (7.39 g) and F-13 (2.32 g) was added to nitric acid (15.11 g) in acetone. The solution was stirred at RT for about 3 h. After stirring, the solution was washed with water/MTBE, and solvent exchanged to PNP was done. TEA (1 w-% of solid polymer) was added and the material was refluxed for 40 min at 95° C. After reflux, the material was washed several times with a water/MTBE mixture. After the washing step, solvent was exchanged to PNP. The material was filtrated using 0.45 µm filters. After dilution and formulation material was ready to be used for coating deposition.

Example 11

A mixture of GPTMS (11.21 g), MEOS (9.32 g) and F-13 (2.20 g) was added to nitric acid (6.52 g) in acetone. The solution was stirred at RT for about 3 h. After stirring, the solution was washed with water/MTBE, and solvent exchanged to PNP. TEA (1 w-% of solid polymer) was added and the material was refluxed for 40 min at 95° C. After reflux, the material was washed several times with a water/MTBE mixture. After the washing step, solvent was exchanged to PNP. The material was filtrated using 0.45 µm filters. After dilution and formulation material was ready to be used for coating deposition.

Example 12

A mixture of GPTMS (15.00 g), MEOS (8.71 g) and F-17 (1.02 g) was added to nitric acid (9.33 g) in acetone. The solution was stirred at RT for about 3 h. After stirring, the solution was washed with water/MTBE, and solvent exchanged to PNP. TEA (8 w-% of solid polymer) was added at RT, and the material was refluxed for 40 min at 95° C. After reflux, the material was washed several times with a water/MTBE mixture. After the washing step, solvent was exchanged to PNP, and the material was refluxed with ClSiMe$_3$ (0.12 g; 0.001 mol) at 105° C. for 90 min. The material was filtrated using 0.45 µm filters. After dilution and formulation material was ready to be used for coating deposition.

Example 13

Nitric acid (11.71 g) was added to a mixture of MEOS (17.00 g) and TMSPM (15.61 g) in 2-propanol. The solution was stirred at RT for about 3 h. After stirring, the solution was washed with water/MTBE, and solvent exchanged to 2-propanol. TEA (8 w-% of solid polymer) was added and material was refluxed for 40 min at 95° C. After reflux material was washed several times by water/MTBE mixture. After the washing step, solvent was exchanged to PNP was done. ClSiMe$_3$ (0.12 g) was added to the material, which was refluxed for 90 minutes at 105° C. After reflux, material was stirred at RT for 60 min. The material was filtrated using 0.45 µm filters. After dilution and formulation material was ready to be used for coating deposition.

Example 14

Acetone (6400 g) and 1,2-Bis(triethoxysilyl)ethane (1600 g) were weighted to reactor equipped with condenser, controlled heating and cooling system. Nitric acid (498 g) was added with a dropping funnel to the reaction mixture and the solution was heated to 80° C. and refluxed for 45 minutes. After refluxing solvent was changed from acetone to PGME (6000 g). The material was filtrated using 0.45 µm filters. After dilution and formulation material was ready to be used for coating deposition.

Example 15

Acetone (2417 g), 2-propanol (805 g), 1,2-Bis(triethoxysilyl)ethane (787,5 g), 3-glycidoxypropyltrimethoxysilane (5.25 g), (Heptadecafluoro-1,1,2,2-tetrahydrodecyl) trimethoxysilane (13.12 g) and nitric acid (250 grams) were mixed and solution was refluxed for 60 minutes at 65 C. After refluxing a solvent exchange was performed to propylene glycol methyl ether (2400 grams). Ethoxytrimethylsilane (3.28 g) was added from solid content and refluxed at 105 C for 30 min. After refluxing a solvent exchange was performed to propylene glycol methyl ether (100 grams). Material solid content was adjusted to process formulation and filtrated with 0.1 µm filter to obtain a process ready solution.

Example 16

Acetone (3807 g), 2-propanol (1269 g), 1,2-Bis(triethoxysilyl)ethane (1200 g), 3-glycidoxypropyltrimethoxysilane (9 g) and (Heptadecafluoro-1,1,2,2-tetrahydrodecyl) trimethoxysilane (60 g) and nitric acid (700 grams) were mixed and solution was refluxed for 120 minutes at 65 C. After refluxing a solvent exchange was performed to propylene glycol methyl ether (3600 grams). Material solid content was adjusted to process formulation and filtrated with 0.1 µm filter to obtain a process ready solution.

Example 17

Acetone (30.39 g), 2-propanol (10.13 g), 1,2-Bis(triethoxysilyl)ethane (10.0 g), 3-glycidoxypropyltrimethoxysilane (0.06 g), Trifluoropropyl trimethoxysilane (0.07 g) and nitric acid (3.08 g) were mixed and solution was refluxed for 120 minutes at 95° C. After refluxing a solvent exchange was performed to propylene glycol methyl ether (45.19 g). Material solid content was adjusted to process formulation and filtrated with 0.1 μm filter to obtain a process ready solution.

Example 18

Acetone (30.39 g), 2-propanol (10.13 g), 1,2-Bis(triethoxysilyl)ethane (10.0 g), 3-glycidoxypropyltrimethoxysilane (0.06 g), tridecafluorotriethoxysilane (0.14 g) and nitric acid (3.08 g) were mixed and solution was refluxed for 120 minutes at 95° C. After refluxing a solvent exchange was performed to propylene glycol methyl ether (45 g). Material solid content was adjusted to process formulation and filtrated with 0.1 μm filter to obtain a process ready solution.

Example 19

Acetone (12 g), 2-propanol (4 g), 1,2-Bis(triethoxysilyl)ethane (20 g), 3-glycidoxypropyltrimethoxysilane (0.15 g), (Heptadecafluoro-1,1,2,2 tetrahydrodecyl)trimethoxysilane (1 g) and nitric acid (7.02 g) were mixed and solution was refluxed for 160 minutes at 90° C. After reflux, solution was cooled down, and solvent exchange to PGME was done. Material solid content was adjusted to process formulation and filtrated with 0.1 μm filter to obtain a process ready solution.

Example 20

Acetone (46.43 g), 2-propanol (15.48 g), 1,2-Bis(triethoxysilyl)ethane (15 g), 3-glycidoxypropyltrimethoxysilane (0.1 g), (Heptadecafluoro-1,1,2,2 tetrahydrodecyl)trimethoxysilane (0.25 g), pentafluorostyrenyltrimethoxysilane (0.13 g) and nitric acid (4.62 g) were mixed and solution was refluxed for 60 minutes at 90° C. After reflux, solution was cooled down, and solvent was exchanged to PGME (74 g). Material solid content was adjusted to process formulation and filtrated with 0.1 μm filter to obtain a process ready solution.

Example 21

Acetone (63.72 g), 2-propanol (21.24 g), 1,2-Bis(triethoxysilyl)ethane (20 g), 3-glycidoxypropyltrimethoxysilane (0.3 g), (Heptadecafluoro-1,1,2,2 tetrahydrodecyl)trimethoxysilane (0.34 g), phenyl trimethoxysilane (0,60 g) and nitric acid (6.4 g) were mixed and solution was refluxed for 120 minutes at 95° C. After reflux, solution was cooled down, and solvent was exchanged to propylene glycol methyl ether (87 g). Material solid content was adjusted to process formulation and filtrated with 0.1 μm filter to obtain a process ready solution.

Example 22

AO214

Acetone (31.35 g), 2-propanol (10.45 g), 1,2-Bis(triethoxysilyl)ethane (10 g), 3-glycidoxypropyltrimethoxysilane (0.21 g), (Heptadecafluoro-1,1,2,2 tetrahydrodecyl)trimethoxysilane (0.17 g), methyltrimethoxysilane (0.07 g) and nitric acid (3.16 g) were mixed and solution was refluxed for 120 minutes at 95° C. After reflux, solution was cooled down, and solvent was exchanged to propylene glycol methyl ether (46.3 g). Material solid content was adjusted to process formulation and filtrated with 0.1 μm filter to obtain a process ready solution

Example 23

Acetone (63.46 g), 2-propanol (21.16 g), 1,2-Bis(triethoxysilyl)ethane (40 g), 3-glycidoxypropyltrimethoxysilane (0.3 g), (Heptadecafluoro-1,1,2,2 tetrahydrodecyl)trimethoxysilane (2 g) and nitric acid (24.4 g) were mixed and solution was refluxed for 3 hours at 95° C. After reflux, solution was cooled down, and solvent exchanged to propylene glycol methyl ether was done. Material solid content was adjusted to process formulation and filtrated with 0.1 μm filter to obtain a process ready solution

Example 24

Prior to use, individual materials produced above were diluted to a solid matter content of 4.5-7% by adding PGME.

At a 4.5% solid matter content the material typically gave a film having a thickness of 100 nm was obtained and a 7% solid matter content resulted in a 300 nm thick film by spin coating.

Depending on what deposition technique is in use it is preferable to use different solvent type or solvent mixtures in the final material formulation. Typically a single solvent is working well for spin coating application, but for example spray coating we have found example, a dilution to 1.5% solid content using a PGME:MEK:EG (2-methoxypropanol:methylethylketone:ethyleneglycol) solution containing said components at a ratio of PGME:MEK:EG=70:27.5:2.5, gives good film forming performance. This is just given as an example and it is always case by case optimization depending on the material composition and deposition technique used.

Example 25

The present materials give hard amorphous coatings with excellent properties of durability due to the high chemical homogeneity.

The material of Example 16 was deposited on Gorilla glass using spin coating from 7% PGME solids formulation and cured at 250° C. for 60 minutes in a convection oven. The resulting film thickness was 315 nm.

The material coating was tested for pencil hardness and the result was 9H according to ASTM D3363-00 pencil hardness test.

The same coating was tested for adhesion and result was 5 B according to ASTM D3359-09 cross-hatch tester.

Also Haze value of the coating was tested according to ASTM D1003-95 standard and the result was 0.002% (on coated Gorilla glass Haze value 0.029%) which demonstrates the superior optical clarity and homogenous/smooth surface coating finish by even improving the bare glass Haze value.

Furthermore, the single layer coating anti-reflection functionality reduced the glass-air interface reflections by over 17%, compared to bare gorilla glass. Steel wool abrasion and cheesecloth (cotton cloth) abrasion test results, in comparison to a commercially available coating, demonstrated also the superior durability of the antireflective anti-smudge/easy-to-clean coating properties. The abrasion test results are given in Tables 1 and 2.

TABLE 1

| Material | Steel wool tests 750 g, 60 strokes/min, 0000 Steel wool (Contact angle measured before and after steel wool abrasion) | | | | |
|---|---|---|---|---|---|
| Number of strokes | 0 | 1000 | 2000 | 3000 | 5000 |
| Commercial coating | 108.15 | 83.3 | 75.87 | 74.05 | 65.29 |
| Coating material from Example 16 | 103.35 | 101.5 | 101.5 | 101.2 | 100.8 |

TABLE 2

| Material | Cheese cloth tests 750 g, 50 strokes/min, cheese cloth (Contact angle measured before and after steel wool abrasion) | | | | | |
|---|---|---|---|---|---|---|
| Number of strokes | 0 | 50000 | | | | |
| Commercial coating | 108.15 | 32.85 | | | | |
| Number of strokes | 0 | 10000 | 20000 | 50000 | 100,000 | 200,000 |
| Coating material from Example 16 | 103.35 | 103.05 | 103.89 | 102.35 | 101.64 | 100.78 |

TABLE 3

| | Films thermally cured at 250° C. for 60 minutes | | Steel wool tests 750 g, 60 strokes/min, 0000 Steel wool (Contact angle measured before and after steel wool abrasion) | | | |
|---|---|---|---|---|---|---|
| Material | Pencil hardness | Film thickness [nm] | Water contact angle | | Oil contact angle | |
| Number of strokes | | | 0 | 1000 | 0 | 1000 |
| Bare Gorilla glass | | | 42 | | 14 | |
| Example 11 | 9H | 110 nm | 93 | 90 | 38 | 35 |
| Example 12 | 9H | 115 nm | 95 | 92 | 40 | 38 |
| Example 14 | 9H | 101 nm | 73 | 68 | 31 | 30 |
| Example 16 | 9H | 315 nm | 103 | 101 | 46 | 45 |
| Example 20 | 9H | 312 nm | 97 | 93 | 42 | 39 |
| Example 21 | 9H | 325 nm | 105 | 90 | 49 | 45 |
| Example 24 | 9H | 305 nm | 100 | 95 | 43 | 40 |

Example 26

1,2-Bis(triethoxysilyl)ethane (100 g), γ-glycidoxypropyltrimethoxysilane (0.38 g), 1H,1H,2H,2H-perfluorodecyltrimethoxysilane (2.45 g), acetone (308 g), 2-propanol (103 g), and 57.7 g nitric acid were mixed and solution was refluxed for 120 minutes at 95° C. After refluxing a solvent exchange was performed to propylene glycol methyl ether. The material was filtrated using 0.45 μm filters. After dilution and formulation material was ready to be used for coating deposition.

Example 27

1,2-Bis(triethoxysilyl)ethane (25 g), 1H,1H,2H,2H-perfluorodecyltrimethoxysilane (0.82 g), acetone (75 g), 2-propanol (25 g), and 15 g nitric acis were mixed and solution was refluxed for 120 minutes at 95° C. After refluxing a solvent exchange was performed to propylene glycol methyl ether. After dilution and formulation material was ready to be used for coating deposition.

Example 28

1,2-Bis(triethoxysilyl)ethane (100 g), γ-glycidoxypropyltrimethoxysilane (2.2 g), 1H,1H,2H,2H-perfluorodecyltrimethoxysilane (3.41 g), acetone (306 g), 2-propanol (103 g), and 57.8 g nitric acid were mixed and solution was refluxed for 120 minutes at 95° C. After refluxing a solvent exchange was performed to propylene glycol methyl ether. After dilution and formulation material was ready to be used for coating deposition.

Example 29

1,2-Bis(triethoxysilyl)ethane (100 g), 3-methacryloxypropyltrimethoxysilane (0.36 g), 1H,1H,2H,2H-perfluorodecyltrimethoxysilane (2.45 g), acetone (305 g), 2-propanol (100 g), and 57.7 g nitirc acid were mixed and solution was refluxed for 120 minutes at 95° C. After refluxing a solvent exchange was performed to propylene glycol methyl ether. Material was formulated to solid content 1.5% with propylene glycol methyl ether (70 w-% from solvents), methyl ethyl ketone (27.5 w-% from solvents), and ethylene glycol (2.5 w-% from solvents). After dilution and formulation material was ready to be used for coating deposition.

Example 30

1,2-Bis(triethoxysilyl)ethane (100 g, 99 mol %), 1H,1H,2H,2H-perfluorodecyltrimethoxysilane (1.63 g), acetone (303 g), 2-propanol (100 g), and 58 g nitric acid were mixed and solution was refluxed for 120 minutes at 95° C. After refluxing a solvent exchange was performed to propylene glycol methyl ether (300 g). Material was formulated to solid content 1.5% with propylene glycol methyl ether (70 w-% from solvents), methyl ethyl ketone (27.5 w-% from solvents), and ethylene glycol (2.5 w-% from solvents). After dilution and formulation material was ready to be used for coating deposition.

Example 31

1,2-Bis(triethoxysilyl)ethane (100 g), 1H,1H,2H,2H-perfluorodecyltrimethoxysilane (8.45 g), acetone (300 g), 2-propanol (100 g), and 58.4 g nitric acid were mixed and solution was refluxed for 120 minutes at 95° C. After refluxing a solvent exchange was performed to propylene glycol methyl ether. Material was formulated to solid content 1.5% with propylene glycol methyl ether (70 w-% from solvents), methyl ethyl ketone (27.5 w-% from solvents), and ethylene glycol (2.5 w-% from solvents). After dilution and formulation material was ready to be used for coating deposition.

Example 32

1,2-Bis(triethoxysilyl)ethane (50 g), 3-methacryloxypropyltrimethoxysilane (0.36 g), 1H,1H,2H,2H-perfluorodecyltrimethoxysilane (2.5 g), acetone (150 g), 2-propanol (50 g), and 31.1 g nitric acid were mixed and solution was refluxed for 120 minutes at 95° C. After refluxing a solvent exchange was performed to propylene glycol methyl ether. After dilution and formulation material was ready to be used for coating deposition.

Example 33

1,2-Bis(triethoxysilyl)ethane (25 g), 3-methacryloxypropyltrimethoxysilane (0.38 g), 1H,1H,2H,2H-perfluorodecyltrimethoxysilane (2.61 g), acetone (75 g), 2-propanol (25 g), and 15.9 g nitric acid were mixed and solution was refluxed for 120 minutes at 95° C. After refluxing a solvent exchange was performed to propylene glycol methyl ether. After dilution and formulation material was ready to be used for coating deposition.

Example 34

1,2-Bis(triethoxysilyl)ethane (25 g), octyltrimethoxysilane (0.17 g), 1H,1H,2H,2H-perfluorodecyltrimethoxysilane (1.25 g), acetone (75 g), 2-propanol (25 g), and 15.5 g nitric acid were mixed and solution was refluxed for 120 minutes at 95° C. After refluxing a solvent exchange was performed to propylene glycol methyl ether. After dilution and formulation material was ready to be used for coating deposition.

Example 35

1,2-Bis(triethoxysilyl)ethane (25 g), methyltriethoxysilane (0.63 g), 1H,1H,2H,2H-perfluorodecyltrimethoxysilane (1.32 g), acetone (75 g), 2-propanol (25 g), and 16 g nitric acid were mixed and solution was refluxed for 120 minutes at 95° C. After refluxing a solvent exchange was performed to propylene glycol methyl ether. Material was formulated to solid content 1.5% with propylene glycol methyl ether (70 w-% from solvents), methyl ethyl ketone (27.5 w-% from solvents), and ethylene glycol (2.5 w-% from solvents). After dilution and formulation material was ready to be used for coating deposition.

Example 36

1,2-Bis(triethoxysilyl)ethane (25 g), dimethyldiethoxysilane (0.69 g), 1H,1H,2H,2H-perfluorodecyltrimethoxysilane (1.32 g), acetone (75 g), 2-propanol (25 g), and 15.8 g nitric acid were mixed and solution was refluxed for 120 minutes at 95° C. After refluxing a solvent exchange was performed to propylene glycol methyl ether. After dilution and formulation material was ready to be used for coating deposition.

Example 37

1,2-Bis(triethoxysilyl)ethane (25 g), tetraethoxysilane (0.97 g), 1H,1H,2H,2H-perfluorodecyltrimethoxysilane (1.32 g), acetone (75 g), 2-propanol (25 g), and 16.2 g nitric acid were mixed and solution was refluxed for 120 minutes at 95° C. After refluxing a solvent exchange was performed to propylene glycol methyl ether. After dilution and formulation material was ready to be used for coating deposition.

Example 38

1,2-Bis(triethoxysilyl)ethane (19 g), methyltriethoxysilane (6.86 g), 1H,1H,2H,2H-perfluorodecyltrimethoxysilane (1.83 g), acetone (75 g), 2-propanol (25 g), and 17.2 g nitric acid were mixed and solution was refluxed for 120 minutes at 95° C. After refluxing a solvent exchange was performed to propylene glycol methyl ether. Material was formulated to solid content 1.5% with propylene glycol methyl ether (70 w-% from solvents), methyl ethyl ketone (27.5 w-% from solvents), and ethylene glycol (2.5 w-% from solvents). After dilution and formulation material was ready to be used for coating deposition.

Example 39

1,2-Bis(triethoxysilyl)ethane (25 g), 3-methacryloxypropyltrimethoxysilane (0.18 g), 1H,1H,2H,2H-perfluorooctyltrimethoxysilane (1.12 g), acetone (75 g), 2-propanol (25 g), and 15.6 g nitric acid were mixed and solution was refluxed for 120 minutes at 95° C. After refluxing a solvent exchange was performed to propylene glycol methyl ether. After dilution and formulation material was ready to be used for coating deposition.

Example 40

1,2-Bis(triethoxysilyl)ethane (25 g,), phenyltrimethoxysilane (0.26 g), 1H,1H,2H,2H-perfluorodecyltrimethoxysilane (2.61 g), acetone (75 g), 2-propanol (25 g), and 15.9 g nitric acid were mixed and solution was refluxed for 120 minutes at 95° C. After refluxing a solvent exchange was performed to propylene glycol methyl ether. After dilution and formulation material was ready to be used for coating deposition.

Example 41

1,2-Bis(triethoxysilyl)ethane (25 g), methyltriethoxysilane (0.21 g), 1H,1H,2H,2H-perfluorodecyltrimethoxysilane (2.61 g), acetone (75 g), 2-propanol (25 g), and 15.9 g nitric acid were mixed and solution was refluxed for 120 minutes at 95° C. After refluxing a solvent exchange was performed to propylene glycol methyl ether. Material was formulated to solid content 1.5% with propylene glycol methyl ether (70 w-% from solvents), methyl ethyl ketone (27.5 w-% from solvents), and ethylene glycol (2.5 w-% from solvents). After dilution and formulation material was ready to be used for coating deposition.

Example 42

1,2-Bis(triethoxysilyl)ethane (25 g), 3-methacryloxypropyltrimethoxysilane (0.6 g), 1H,1H,2H,2H-perfluorooctyltrimethoxysilane (4.1 g), acetone (75 g), 2-propanol (25 g), and 16.3 g nitric acid were mixed and solution was refluxed for 120 minutes at 95° C. After refluxing a solvent exchange was performed to propylene glycol methyl ether. Material was formulated to solid content 1.5% with propylene glycol methyl ether (70 w-% from solvents), methyl ethyl ketone (27.5 w-% from solvents), and ethylene glycol (2.5 w-% from solvents). After dilution and formulation material was ready to be used for coating deposition.

Example 43

1,2-Bis(triethoxysilyl)ethane (25 g), methyltriethoxysilane (1.41 g), 1H,1H,2H,2H-perfluorodecyltrimethoxysilane (2.93 g), acetone (75 g), 2-propanol (25 g), and 16.9 g nitric acid were mixed and solution was refluxed for 120 minutes at 95° C. After refluxing a solvent exchange was performed to propylene glycol methyl ether. After dilution and formulation material was ready to be used for coating deposition.

Example 44

1,2-Bis(triethoxysilyl)ethane (25 g), methyltriethoxysilane (0.22 g), 1H,1H,2H,2H-perfluorodecyltrimethoxysilane (4.05 g), acetone (75 g), 2-propanol (25 g), and 16.19 g nitric acid were mixed and solution was refluxed for 120 minutes at 95° C. After refluxing a solvent exchange was performed to propylene glycol methyl ether. After dilution and formulation material was ready to be used for coating deposition Example 45

1,2-Bis(triethoxysilyl)ethane (25 g), triethoxysilylpropylethylcarbamate (0.45 g), 1H,1H,2H,2H-perfluorodecyltrimethoxysilane (2.61 g), acetone (75 g), 2-propanol (25 g), and 15.9 g nitric acid were mixed and solution was refluxed for 120 minutes at 95° C. After refluxing a solvent exchange was performed to propylene glycol methyl ether. Material was formulated to solid content 0.75% with propylene glycol methyl ether (70 w-% from solvents), methyl ethyl ketone (27.5 w-% from solvents), and ethylene glycol (2.5 w-% from solvents). After dilution and formulation material was ready to be used for coating deposition.

INDUSTRIAL APPLICABILITY

The present materials can be used in optoelectronics device structures such as display devices, touch screen devices and photovoltaic devices (cells, panels and modules), luminaires, construction glass units and apparatuses to give surfaces with properties of high hardness, adhesion, scratch resistance, anti-soiling and cleanability.

Particular applications are the following: Computer or personal communication devices typically comprising a housing; a central processing unit (CPU); and a display; wherein the display comprises; an array of optical elements; a touch sensor; and a glass cover having a coating that is antireflective and oleophobic. Generally, the present invention relates to applications in which the product has at least a portion comprising glass, the glass having an antireflective and hydro- and oleophobic coating thereon.

Examples of the above include fingerprint reading devices, alarm and security devices, tables and desks, glass containers, perfume bottles, drinking glasses, glass doors and windows, computers, and personal communication devices, such as mobile telephones, and tablets.

REFERENCE SIGNS LIST

100, 200, 300, 400, 500, 600, 700 Substrate
110, 210, 310, 410, 510, 610, 710 Coating layer (front side)
220, 420 Coating layer (back side)
205, 405 Surface treatment chemical layer (front side), or optionally other functional coating layer
215, 415 Surface treatment chemical layer (back side), or optionally other functional coating layer

CITATION LIST

Patent Literature

EP 1 555 249 A1
U.S. Pat. No. 7,094,709

The invention claimed is:
1. A method for making a coated glass, the method comprising:
coating a glass with a liquid phase coating; and
baking, UV hardening, or both, the coating on the glass, wherein:
the coated glass comprises a polymer having silicon, oxygen and carbon in the backbone;
the coating on the glass has a refractive index of 1.22 to 1.5, a pencil hardness of 8H or more, a water contact angle of 90 degrees or more, and an oil contact angle of 35 degrees or more; and
the coating deposited by the liquid phase coating is formed by combining:
a first monomer having the chemical formula:

$R^{11}_xR^{12}_ySiC_3H_6R^{13}$, wherein
$R^{11}$ is an alkoxy, acetoxy or chloro group and where x is 2 or 3,
$R^{12}$ is an alkyl group where y is 0 or 1, and
$R^{13}$ is an epoxy, acrylate, methacrylate, group;
a second monomer having the chemical formula:

$R^{14}_aR^{15}_bSiC_2H_4(CF_2)_nCF_3$, wherein
$R^{14}$ is an alkoxy, acetoxy or chloro group and where a is 2 or 3,
$R^{15}$ is an alkyl group where b is 0 or 1, and
n is an integer from 3 to 25; and
a third monomer having the chemical formula:

$R^{16}_cR^{17}_dSiC_2H_4SiR^{18}_eR^{19}_f$, wherein
$R^{16}$ is a an alkoxy, acetoxy or chloro group and wherein c=2 or 3,
$R^{17}$ is an alkyl group or H and wherein d=0 or 1,
$R^{18}$ is an alkoxy, acetoxy or chloro group and wherein e=2 or 3, and
$R^{19}$ is an alkyl group or H and wherein f=0 or 1.
2. A method of increasing the hardness and oleophobicity of a computer or personal communication device having a touch sensitive screen, the method comprising:
polymerizing a plurality of monomers that comprise silicon, oxygen and carbon so as to form a carbosiloxane polymer with a molecular weight of at least 2000;
depositing the carbosiloxane polymer with a liquid phase process at atmospheric pressure on a glass substrate; and
further providing a CPU, a display, a touch sensor layer, and a housing so as to form the computer or personal communication device with a touch sensitive screen, wherein:
after hardening the polymer on the glass substrate, the carbosiloxane polymer has a hardness of at least 8H, a refractive index of from 1.22 to 1.46, a water contact angle of at least 90 degrees, and an oil contact angle of at least 35 degrees;

the amount of sunlight reflected from the glass substrate is at least 1.5% less due to the carbosiloxane polymer layer as compared to the same glass substrate without the carbosiloxane polymer layer the carbosiloxane polymer is formed by combining:

a first monomer having the chemical formula:

$$R^{11}_xR^{12}_ySiC_3H_6R^{13},$$

wherein $R^{11}$ is an alkoxy, acetoxy or chloro group and where x is 2 or 3, $R^{12}$ is an alkyl group where y is 0 or 1, and $R^{13}$ is an epoxy, acrylate, methacrylate group;

a second monomer having the chemical formula:

$$R^{14}_aR^{15}_bSiC_2H_4(CF)_nCF_3,$$

wherein $R^{14}$ is an alkoxy, acetoxy or chloro group and where a is 2 or 3, $R^{15}$ is an alkyl group where b is 0 or 1, and n is an integer from 3 to 25; and a third monomer having the chemical formula:

$$R^{16}_cR^{17}_dSiC_2H_4SiR^{18}_eR^{19}_f,$$

wherein $R^{16}$ is a an alkoxy, acetoxy or chloro group and wherein c=2 or 3, $R^{17}$ is an alkyl group or H and wherein d=0 or 1, $R^{18}$ is an alkoxy, acetoxy or chloro group and wherein e=2 or 3, and $R^{19}$ is an alkyl group or H and wherein f=0 or 1.

* * * * *

UNITED STATES PATENT AND TRADEMARK OFFICE
CERTIFICATE OF CORRECTION

PATENT NO. : 10,836,675 B2
APPLICATION NO. : 15/557689
DATED : November 17, 2020
INVENTOR(S) : Jarkko Leivo et al.

It is certified that error appears in the above-identified patent and that said Letters Patent is hereby corrected as shown below:

On the Title Page

Item (51), Column 1, under "Int. Cl.", Lines 1-4,
      *C03C 17/30*    (2006.01)
      *G06F 1/16*     (2006.01)
      *H04M 1/02*   (2006.01)
delete "*C08L 83/08*   (2006.01)" and insert -- *C03C 17/30*   (2006.01) --, therefor.

In the Specification

In Column 1, Line 31, delete "optoelectonic" and insert -- optoelectronic --, therefor.

In Column 1, Line 53, delete "example" and insert -- example, --, therefor.

In Column 2, Line 9, delete "particular" and insert -- particular, --, therefor.

In Column 3, Line 43, delete "polymerzing" and insert -- polymerizing --, therefor.

In Column 3, Line 48, delete "composition" and insert -- composition. --, therefor.

In Column 4, Line 32, delete "a an" and insert -- an --, therefor.

In Column 4, Line 56, delete "a the" and insert -- the --, therefor.

In Column 6, Line 50, delete "620;" and insert -- 620; and --, therefor.

In Column 6, Line 53, delete "710;" and insert -- 710. --, therefor.

In Column 6, Lines 65-66, delete "substitutents." and insert -- substituents. --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,836,675 B2

In Column 9, Line 36, delete "bi-silanes." and insert -- bisilanes. --, therefor.

In Column 11, Line 16, delete "substitutents" and insert -- substituents --, therefor.

In Column 12, Line 34, delete "a an" and insert -- an --, therefor.

In Column 13, Line 9, delete "a the" and insert -- the --, therefor.

In Column 13, Line 56, delete "glycidylmethacrylate," and insert -- glycidyl methacrylate, --, therefor.

In Column 14, Line 41, delete "is is" and insert -- is --, therefor.

In Column 17, Line 5, delete "nanoparticples" and insert -- nanoparticles --, therefor.

In Column 19, Line 11, delete "(propandiol-monopropyl" and insert -- (propanediol-monopropyl --, therefor.

In Column 19, Line 12, delete "(propandiol-monobutyl" and insert -- (propanediol-monobutyl --, therefor.

In Column 19, Line 19, delete "MTEOS-Methyltriethoxy silane" and insert -- MTEOS-Methyltriethoxysilane --, therefor.

In Column 24, Line 2, delete "solution" and insert -- solution. --, therefor.

In Column 24, Line 15, delete "solution" and insert -- solution. --, therefor.

In Column 25, Line 55, delete "acis" and insert -- acid --, therefor.

In Column 26, Line 48, delete "nitirc" and insert -- nitric --, therefor.

In Column 29, Line 25, delete "deposition" and insert -- deposition. --, therefor.

In the Claims

In Column 30, Claim 1, Line 34, delete "methacrylate," and insert -- or methacrylate --, therefor.

In Column 30, Claim 1, Line 37, delete "$R^{14}_a R^{15}_b SiC_2H_4(CF)_n CF_3$," and insert -- $R^{14}_a R^{15}_b SiC_2H_4(CF_2)_n CF_3$, --, therefor.

In Column 30, Claim 1, Line 47, delete "a an" and insert -- an --, therefor.

In Column 31, Claim 2, Line 7, delete "layer" and insert -- layer; --, therefor.

In Column 31, Claim 2, Line 17, delete "methacrylate," and insert -- or methacrylate --, therefor.

CERTIFICATE OF CORRECTION (continued)
U.S. Pat. No. 10,836,675 B2

In Column 32, Claim 2, Line 2, delete "$R^{14}_a R^{15}_b SiC_2H_4(CF)_n CF_3$," and insert -- $R^{14}_a R^{15}_b SiC_2H_4(CF_2)_n CF_3$, --, therefor.

In Column 32, Claim 2, Line 12, delete "a an" and insert -- an --, therefor.